No. 713,880. Patented Nov. 18, 1902.
H. D. HIBBARD.
FASTENING FOR SAFE OR VAULT PLATES.
(Application filed Mar. 7, 1902.)
(No Model.)

Witnesses:-
R. S. Strahan
Fred E. Maynar

Inventor,
Henry D. Hibbard.
By his Attorney,
F. H. Richards

UNITED STATES PATENT OFFICE.

HENRY D. HIBBARD, OF PLAINFIELD, NEW JERSEY, ASSIGNOR TO HIBBARD-RODMAN-ELY SAFE COMPANY, OF NEW YORK, N. Y., A CORPORATION OF NEW JERSEY.

FASTENING FOR SAFE OR VAULT PLATES.

SPECIFICATION forming part of Letters Patent No. 713,880, dated November 18, 1902.

Application filed March 7, 1902. Serial No. 97,040. (No model.)

*To all whom it may concern:*

Be it known that I, HENRY DEMING HIBBARD, a citizen of the United States, residing in Plainfield, in the county of Union and State of New Jersey, have invented certain new and useful Improvements in Fastenings for Safe or Vault Plates, of which the following is a specification.

This invention relates to fastenings for safe or vault wall components or plates, the object of the invention being to provide a somewhat different form of fastening from that shown and described in my contemporaneously-pending application filed herewith, and which may be used with what is ordinarily understood to be unmachineable metal plates—such, for instance, as manganese steel plates, which, as is well known, it is not practicable to drill or cut to form bolt-openings for the reception of bolts or other forms of fastening means necessary to be inserted through holes formed by such tools, and by means of which fastening the wall components or plates will have their contiguous faces or edges brought together under high tension, thereby obtaining a high initial resistance, which must be first overcome before such plates can be separated.

Figures 1, 2:
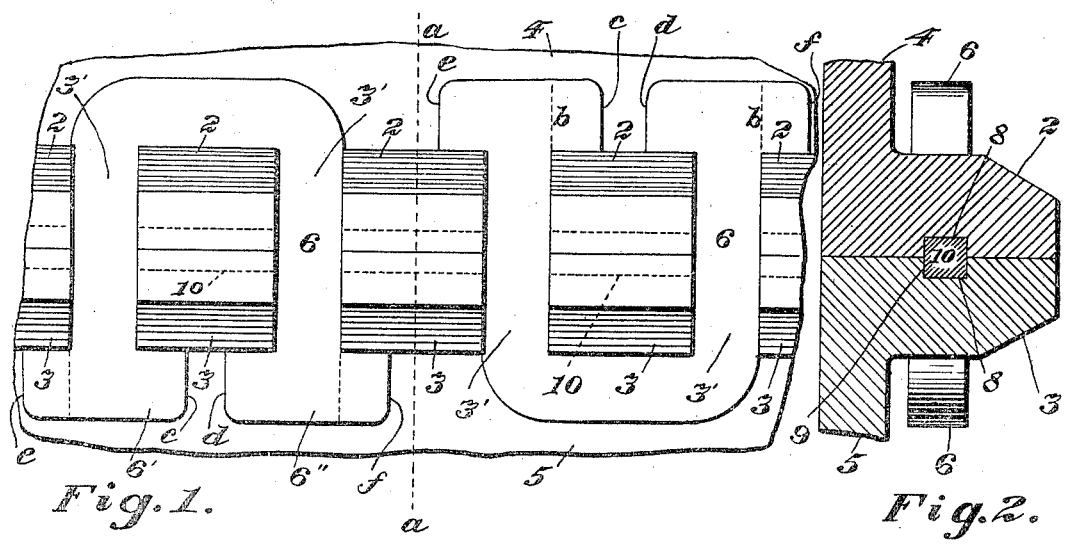
Figure 3:
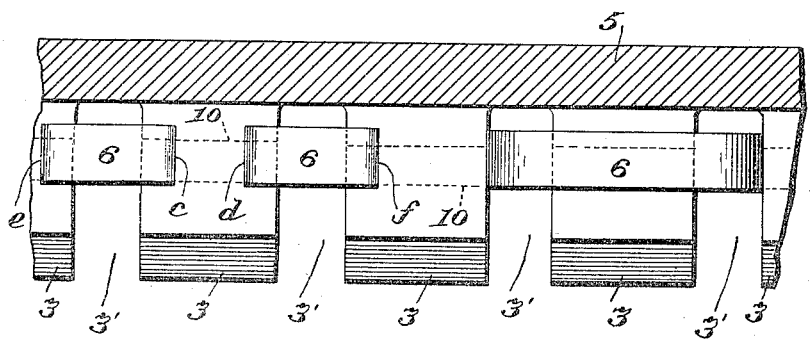
Figure 4:
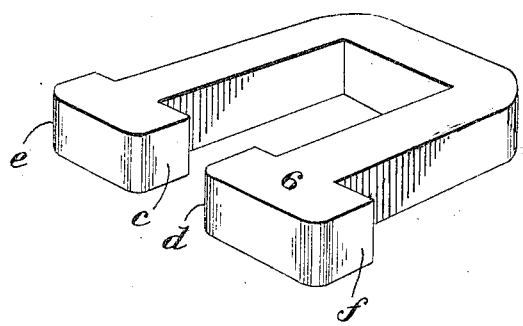

In the drawings accompanying and forming a part of this specification, Figure 1 is a view of a series of these fastening devices connecting a pair of members or plates. Fig. 2 is a cross-sectional view taken in line *a a* Fig. 1. Fig. 3 is a top view of the fastening shown in Fig. 1, and Fig. 4 is a perspective view of the fastening device.

Similar characters of reference designate corresponding parts in the different figures of the drawings.

In practice any desired number of these improved fastenings may be used, according to the size and character of the members or plates to be united. It will be understood that these fastenings may be used to connect various kinds and formations of plates and also different parts of a safe or vault. In my patent No. 662,433, dated November 7, 1900, I have shown plates connected by links shrunk onto projections of such plates. In the present instance in place of the links I use retaining members, which are likewise shrunk onto the projections of the plates; but these retaining members are in the form of tie-bolts. In my contemporaneously-pending application, hereinbefore referred to, these tie-bolts in the preferred form thereof are shown as I-bolts. In the present instance the tie-bolts are U-shaped. This fastening comprises a plurality of projections 2 and 3, rigid or integral with a pair of safe or vault members or plates 4 and 5, to be secured together. In the form shown each plate is provided with several projections 2 or 3, located at the inner side and adjacent to the edge thereof and in position to register with corresponding projections carried by the other member or plate. The projections may be of any desired shape, and instead of forming them as separate and independent of each other the plates may be provided with flanges having transverse recesses formed therein at intervals during the casting of the plates for the reception of such fastening devices. The projections 2 and 3 of the plates form intermediate recesses 3', into which the legs of the tie-bolt are placed. To unite the projections together under sufficient tension to resist the opening of the joint, a retaining device is provided, which in the form shown comprises an angle member or tie-bolt 6, constructed in the preferred form thereof, to coöperate with several sets of projections. In the main form shown this tie-bolt is U-shaped, and when located in position each transverse portion or head 6' or 6" overlaps a pair of projections 3 of the same plate, forming parts of different sets, while the arch or yoke 6''' of the bolt incloses a pair of projections constituting one set. In this form of bolt it will be seen that the opposing portions *c d* of the transverse heads engage a projection of the same set which is inclosed by the yoke of the bolt, while the relatively remote transverse portions *e f* engage projections of different sets. In the organization shown the tie-bolts are alternately located— that is to say, the yoke of one bolt is in a position reverse to that of another. Consequently two bolts will rigidly clamp together three sets of projections and assist in clamping two other sets. Instead of forming the bolt with each transverse head thereof projecting at opposite sides of its leg it could be formed without the portions e and f, Fig. 1, in which instance the bolt would simply clamp a pair of projections together. In another form thereof the portion or portions at the right of the dotted lines b, Fig. 1, could be dispensed with, in which case one bolt would assist in clamping two sets of projections together. Of course it will be understood that the transverse heads of the bolts may be varied in length as circumstances may require, and one part could be longer than another, if desired. The preferable form of bolt, however, is a U-shaped bolt having each of its transverse heads projecting in opposite directions, whereby one bolt assists in clamping three sets of projections together, and whereby also the strain will come equally on all parts thereof, and whereby each bolt will, without assistance from any other bolt, secure or clamp two projections, while two bolts will clamp three sets of projections together under high tension. In practice these tie-bolts, having been first heated, are inserted in the recesses between the projections and shrunk thereon, whereby the joints are formed under high pressure—that is to say, the edge faces of the plates or members are drawn together with great force and under high tension—thereby obtaining high initial resistance, which, as will be readily seen, must be first overcome before such plates can be separated to effect an entrance into the joint. By means of this fastening safes, vaults, and strong boxes may be made of highly-resisting material and of composite construction and which will be for all practical purposes as strong as an integral structure, since the fastening devices being shrunk on become to a certain extent integral with the projections. When the plates are large and heavy, it will be seen that by providing a number of these fastenings located side by side at the desired intervals it will not be practicable to separate the plates even by the use of high explosives, especially when such plates are formed of manganese steel or other unmachineable metal, since the edges of the plates being drawn together with great force, and it not being practicable, as is well known, to drill into plates of this character sufficiently to permit the entrance of nitroglycerin, it is not possible in any known manner to separate the plates at the joint when connected by this improved fastening. Moreover, the use of this fastening avoids the necessity of impairing the integrity of the plates for the insertion of bolts or the necessity of connecting the plates by threads. The projections formed in the manner herein shown and described constitute levers, the ends of which form fulcrums, and to which levers the fastening devices are usually applied substantially midway of their length, considering the outer faces of the plates as a part thereof. In this way an effective means is obtained for reducing the tendency of any force applied at the outside of the plates at the joint thereof to turn the levers within the fastening devices, and thus permit the joint to open.

For locating the projections, and thereby the members or plates rigid therewith, in a fixed position or alinement relative to each other, and so prevent the forcing of one plate inwardly independent of its companion plate, means coöperating with recessed walls of the projections is provided. In one form thereof this means may be independent of the tie-bolt, and in this instance each of the projections is shown provided in its inner face with a recess or slot 8, which when in communication with a similar recess or slot of a companion registering projection forms a keyway 9 for the reception of a key 10, by means of which the projections and the members or plates formed as part thereof or rigid therewith may be located in proper alinement and in fixed position relative to each other, so that the forcing of one inwardly independently of the other is not possible.

The term "plates" as used herein and in the claims is to be interpreted to include, when the fastening is used to assemble the various parts of a vault or safe or analogous structure, the front or other part of such structure, whether the same is formed as a flat or curved plate or as a member formed of one or more parts.

Having described my invention, I claim—

1. A fastening comprising in combination with a plurality of safe or vault plates or wall components set edge to edge, parts or projections rigid with each of said plates; and a retaining device located in position and coöperating with a plurality of sets of projections for securing said plates together.

2. A fastening comprising in combination with a plurality of wall-plates or wall-components set edge to edge, parts or projections rigid with each of said plates; and a shrunk-on retaining device coöperating with a plurality of sets of projections for clamping said plates together.

3. A fastening comprising in combination with a plurality of safe or vault plates or wall components set edge to edge, parts or projections rigid with each of said plates; and means located in position to partially surround a pair of projections and to also engage a projection of a different set for clamping said plates together.

4. A fastening comprising in combination with a plurality of safe or vault plates or wall components set edge to edge, parts or projections rigid with each of said plates, shrunk-on means inclosing a pair of such projections and engaging projections of different sets thereby to clamp said plates together.

5. A fastening comprising in combination with a plurality of safe or vault plates or wall components set edge to edge, a part or projection rigid with each of said plates; and a U-shaped tie-bolt having a transversely-extending portion opposite to its yoke portion and constituting together with said yoke portion clamping means engaging said projections for clamping said plates together.

6. A fastening comprising in combination with a plurality of safe or vault plates or wall components set edge to edge, parts or projections rigid with each of said plates; and a shrunk-on U-shaped tie-bolt coöperating with a plurality of sets of said projections for clamping the plates together.

7. A fastening comprising in combination with a plurality of safe or vault plates or wall components set edge to edge, parts or projections rigid with each of said plates; and a U-shaped tie-bolt having a transverse portion or head engaging a projection of a set different from that with which the yoke portion of said bolt engages.

8. A fastening comprising in combination with a plurality of safe or vault plates or wall components set edge to edge parts or projections rigid with each of said plates and located on the interior of the safe or vault when said plates are assembled, and a tie-bolt having a yoke at one end and a plurality of transversely-extending portions at its opposite end and constituting together with said yoke portion clamping means engaging said projections for clamping the plates together.

9. A safe or vault wall component or plate fastening comprising a plurality of projections rigid with each of a pair of plates, the projections of one plate registering with those of another, and a plurality of yoke-formed alternately-located fastening devices clamping said projections together.

10. A safe or vault wall component or plate fastening, comprising a plurality of projections rigid with each of a pair of plates, the projections of one plate registering with those of another, and a plurality of alternately-located shrunken-on U-shaped tie-bolts clamping such projections together.

11. A fastening comprising in combination with a plurality of safe or vault plates or wall components set edge to edge, parts or projections rigid with each of said plates, a retaining device coöperating with a plurality of sets of projections for securing said plates together, and means for locating said plates in fixed position or alinement relative to each other.

12. A fastening comprising in combination with a plurality of plates or wall components set edge to edge, parts or projections rigid with each of said plates, a shrunk-on retaining device coöperating with a plurality of sets of projections for clamping said plates together; and means for locating said plates in fixed position or alinement relative to each other.

13. A fastening comprising in combination with a plurality of safe or vault plates or wall components set edge to edge, parts or projections rigid with each of said plates; shrunk-on means located in position to inclose a pair of such projections and to engage projections of different sets thereby to clamp the edges of said plates together, and means for locating said plates in fixed position or alinement relative to each other.

14. A fastening comprising in combination with a plurality of safe or vault plates or wall compartments set edge to edge, a part or projection rigid with each of said plates; a U-shaped tie-bolt coöperating with said projections for clamping the plates together; and means for locating said plates in fixed position or alinement relative to each other.

15. A fastening comprising in combination with a plurality of safe or vault plates or wall components set edge to edge, parts or projections rigid with each plate; a shrunk-on U-shaped tie-bolt having a transverse portion or head engaging the projection of a set different from that with which the yoke portion of said bolt engages; and means for locating said plates in fixed position or alinement relative to each other.

16. A safe or vault wall component or plate fastening comprising a plurality of projections rigid with each of a pair of plates, the projections of one plate registering with those of another, a plurality of alternately-located fastening devices coöperating to clamp said projections together, and means for locating said plates in fixed position or alinement relative to each other.

17. A safe or vault wall component or plate fastening comprising a plurality of projections rigid with each of a pair of plates, the projections of one plate registering with those of another and each pair of registering projections having a keyway; a key located therein; and a shrunk-on U-shaped tie-bolt coöperating with a plurality of sets of projections for clamping said plates together.

18. A tie-bolt comprising a U-shaped structure having one or more transverse, inwardly-extending heads constituting together with the yoke portion of said plate the clamping means between which a plurality of safe or vault projections are clamped.

19. A tie-bolt comprising a U-shaped structure having a pair of transversely-extending heads one or both having portions extending inwardly and constituting together with the yoke portion of such bolt the clamping means between which a plurality of safe or vault plate projections are clamped, and one or both having portions projecting outwardly for engaging a projection or projections of another set.

HENRY D. HIBBARD.

Witnesses:
C. A. WEED,
JOHN O. SEIFERT.